(12) United States Patent
Yamanaka

(10) Patent No.: US 8,672,425 B2
(45) Date of Patent: Mar. 18, 2014

(54) CABINET STRUCTURE ASSEMBLY

(75) Inventor: Takahito Yamanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 77 days.

(21) Appl. No.: 13/414,972

(22) Filed: Mar. 8, 2012

(65) Prior Publication Data

US 2012/0229008 A1 Sep. 13, 2012

(30) Foreign Application Priority Data

Mar. 11, 2011 (JP) ................................. 2011-054800

(51) Int. Cl.
| | |
|---|---|
| *F16B 37/00* | (2006.01) |
| *F16B 37/04* | (2006.01) |
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *A47B 96/00* | (2006.01) |
| *A47K 5/00* | (2006.01) |
| *F16L 3/08* | (2006.01) |
| *A47B 5/00* | (2006.01) |

(52) U.S. Cl.
USPC ............... 312/7.2; 411/104; 403/21; 403/22; 248/220.21; 248/221.11; 248/222.11

(58) Field of Classification Search
USPC ............... 312/245, 7.2, 257.1; 348/836, 843; 248/220.21, 221.11, 222.11, 222.14, 248/223.41, 224.7, 224.8, 228.1, 300, 235, 248/247; 411/104, 970; 403/21, 22, 397
See application file for complete search history.

(56) References Cited

U.S. PATENT DOCUMENTS

| | | | | |
|---|---|---|---|---|
| 5,899,499 | A * | 5/1999 | Ito ................................. | 280/808 |
| 6,715,185 | B2 * | 4/2004 | Angellotti ....................... | 24/297 |
| 6,854,941 | B2 * | 2/2005 | Csik ............................... | 411/112 |
| 7,165,371 | B2 * | 1/2007 | Yoyasu ......................... | 52/716.5 |
| 7,178,855 | B2 * | 2/2007 | Catron et al. ............... | 296/146.7 |
| 7,236,353 | B2 * | 6/2007 | Davidson et al. ........ | 361/679.34 |
| 2003/0019990 | A1* | 1/2003 | Iinuma et al. .............. | 248/309.1 |
| 2007/0107174 | A1* | 5/2007 | Bordas .......................... | 24/664 |
| 2008/0277548 | A1* | 11/2008 | Kameoka ................. | 248/222.14 |
| 2008/0310931 | A1* | 12/2008 | Csik et al. ...................... | 411/103 |
| 2009/0064467 | A1* | 3/2009 | Xueyong et al. ................ | 24/292 |
| 2012/0229009 | A1* | 9/2012 | Fukumoto .................. | 312/293.3 |

FOREIGN PATENT DOCUMENTS

| | | | | |
|---|---|---|---|---|
| JP | 10-215076 | A | 8/1998 | |
| JP | 2005-243920 | A | 9/2005 | |
| JP | 2008180318 | A * | 8/2008 | ............. F16B 37/04 |
| JP | 2010-278292 | A | 12/2010 | |

\* cited by examiner

*Primary Examiner* — Janet M Wilkens
*Assistant Examiner* — Andrew Roersma
(74) *Attorney, Agent, or Firm* — Global IP Counselors, LLP

(57) ABSTRACT

A cabinet structure assembly includes a cabinet, an attachment cover and an attachment member. The attachment cover includes a top wall portion. The top wall portion has an engagement recess with a first engagement face and an end part. The attachment member includes a base plate and a top plate. The top plate has a top face and an engagement protrusion that protrudes relative to the top face. The engagement protrusion has a second engagement face and a guide face. The second engagement face faces the first engagement face of the engagement recess. The guide face is arranged such that the guide face gradually deforms the end part of the top wall portion of the attachment cover away from the top face of the top plate upon installation of the attachment member relative to the attachment cover.

15 Claims, 8 Drawing Sheets

CABINET STRUCTURE ASSEMBLY

CROSS-REFERENCE TO RELATED APPLICATIONS

This application claims priority to Japanese Patent Application No. 2011-054800 filed on Mar. 11, 2011. The entire disclosure of Japanese Patent Application No. 2011-054800 is hereby incorporated herein by reference.

BACKGROUND

1. Field of the Invention

The present invention generally relates to a cabinet structure assembly. More specifically, the present invention relates to a cabinet structure assembly for attaching an attachment member to a cabinet.

2. Description of the Related Art

With conventional image display devices, a variety of wall brackets have been proposed. The wall brackets are mounted to an interior wall or the like, and are attached to a cabinet of the image display device. Specifically, with a conventional image display device, a cabinet of the image display device is engaged with a hook-shaped hanger of a wall hanging device as a wall bracket (see Japanese Laid-Open Patent Application Publications Nos. 2005-243920 and H10-215076, for example). Furthermore, with another conventional device, a claw latching projection wall of an adapter as a wall bracket is engaged with a fixed latching claw and a movable latching claw of an electronic device as an image display device (see Japanese Laid-Open Patent Application Publication No. 2010-278292).

Meanwhile, another type of conventional structure employs a sheet metal attachment member with a threaded hole. The attachment member is mounted to a cabinet of an image display device in order to attach the cabinet to a wall bracket.

Specifically, one conventional structure of this type has an attachment member (e.g., a wall mount bracket). The attachment member is made of sheet metal and formed in a crank shape in side view. The attachment member is fastened with an attachment screw to a cabinet. Specifically, the attachment member is disposed on an inside of a plastic rear cabinet of a flat-screen television set. The attachment member has a threaded hole. The threaded hole faces an opening on the rear cabinet.

Another conventional structure for this type has a support frame and an attachment member. The support frame is formed in a square tube shape, and is made of plastic. The support frame is integrally formed on an inside of a cabinet. Specifically, the support frame is formed on a plastic rear cabinet of a flat-screen television set. The attachment member is made of sheet metal. The attachment member is press-fitted into the support frame. The support frame is then covered with a plastic box-shaped cover such that an opening in the support frame is covered by this box-shaped cover. With this conventional structure, the attachment member further has a threaded hole that faces an opening of the rear cabinet. The rear cabinet further has an engagement hook for fixing the box-shaped cover.

SUMMARY

It has been discovered that, with the above-mentioned conventional structures, the work entailed by screwing the attachment member to the rear cabinet is time-consuming. In particular, when the attachment members are mounted at a plurality of places (such as four places) on the rear cabinet, screws need to be fastened at each of these places, which makes the assembly work much more difficult. Also, television sets have increasingly been moving toward flat-screen style of late. Thus, there is a trend in which an attachment position of the attachment member is closer to a wiring board that is essential to the control of the television set. Because of this, a large prohibited region in which there is no control circuit on the wiring board must be ensured in order to ensure adequate spacing between the attachment member and the control circuit formed on the wiring board, to meet ESD testing (electrostatic damage testing) requirements, and so forth. This is disadvantageous to board design.

On the other hand, with the above-mentioned conventional structure having the box-shaped cover, the attachment member inserted into the plastic support frame is covered by the box-shaped cover made of plastic (e.g., a non-conductor). With this configuration, a range over which the discharge of static electricity from the attachment member will adversely affect the control circuit of the wiring board becomes smaller. Therefore, it is possible to reduce the size of the prohibited region in which no control circuit is provided to the wiring board, which is advantageous to board design. Also, the attachment member is fixed merely by inserting the attachment member into the support frame. Thus, even when the attachment member is mounted at four places on the rear cabinet, a situation in which the assembly work is made more difficult by the work of fastening screws can be avoided.

However, it has also been discovered that the above-mentioned conventional structure requires two steps in assembly, namely, a step of tightly press-fitting the attachment member into the support frame, and a step of covering the support frame into which the attachment member has been inserted with the box-shaped cover. Therefore, it is difficult to remove the attachment member. Also, the support frame has to be formed on the rear cabinet, and forming the box-shaped cover also entails extra work.

An improved cabinet structure assembly was conceived in light of the above-mentioned problem. One object of the present disclosure is to provide a cabinet structure assembly with which assembly work becomes easier and the assembly process entails a single step.

In accordance with one aspect of the present disclosure, a cabinet structure assembly includes a cabinet, an attachment cover and an attachment member. The cabinet includes a wall with an inner face. The attachment cover is disposed on the inner face of the cabinet. The attachment cover includes a top wall portion that faces the inner face of the cabinet and a side wall portion that extends between the inner face of the cabinet and the top wall portion. The top wall portion has an engagement recess with a first engagement face and an end part with an edge that defines an access opening of the attachment cover between the edge of the end part of the top wall portion and the inner face of the cabinet. The end part of the top wall portion is disposed between the engagement recess and the access opening. The attachment member is detachably disposed within the attachment cover for removal through the access opening of the attachment cover. The attachment member includes a base plate and a top plate. The base plate has a threaded hole that is aligned with a through-hole of the inner face of the cabinet. The top plate is arranged relative to the base plate. The top plate has a top face and an engagement protrusion that protrudes relative to the top face. The engagement protrusion has a second engagement face and a guide face. The second engagement face faces the first engagement face of the engagement recess. The guide face is sloped relative to the top face of the top plate. The guide face is arranged such that the guide face gradually deforms the end part of the top wall portion of the attachment cover away from the top face of the top plate upon installation of the attachment member relative to the attachment cover.

With the cabinet structure assembly, it is possible to provide a cabinet structure assembly with which assembly work becomes easier and the assembly process entails a single step.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from these disclosures that the following descriptions of the selected embodiments are provided for illustration only and not for the purpose of limiting the invention as defined by the appended claims and their equivalents.

Figure 1:
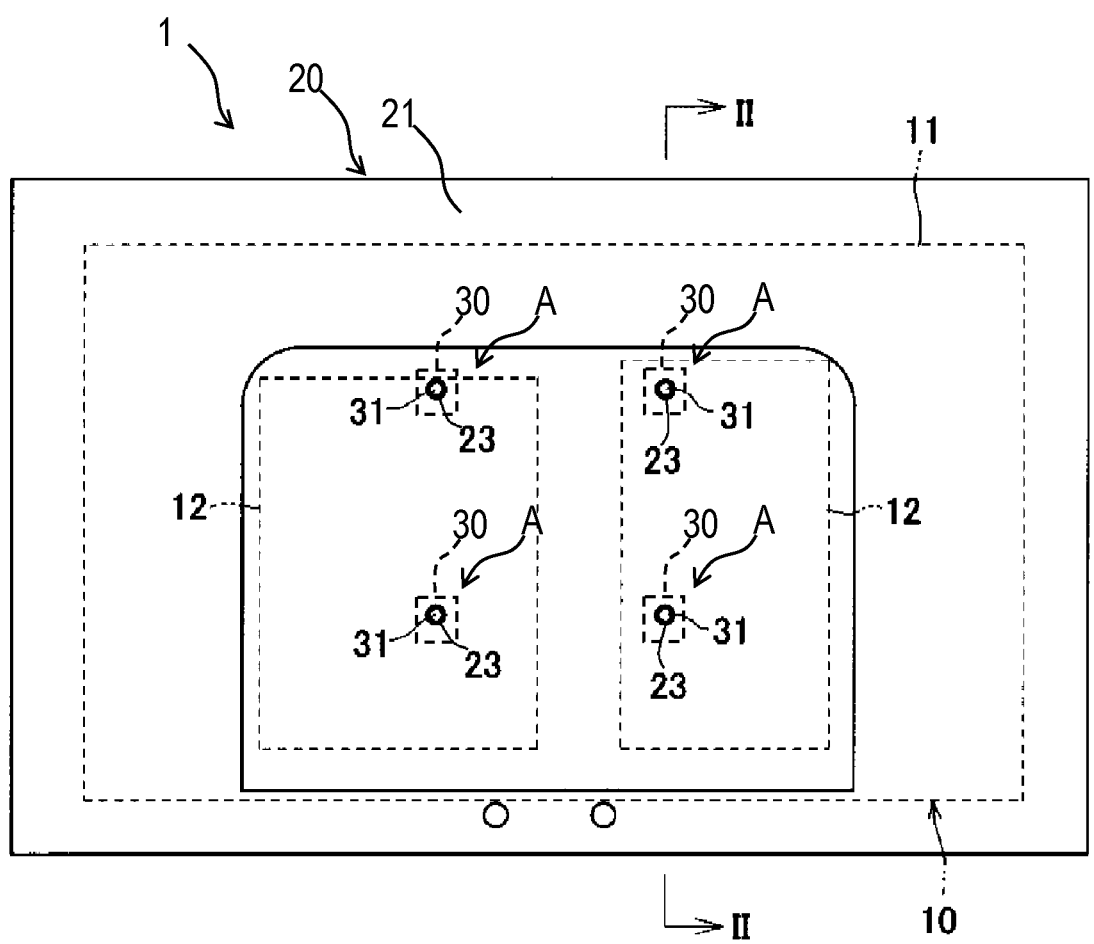
FIG. 1 is a rear elevational view of a flat-screen television set having a mount structure in accordance with one embodiment.
Figure 2:
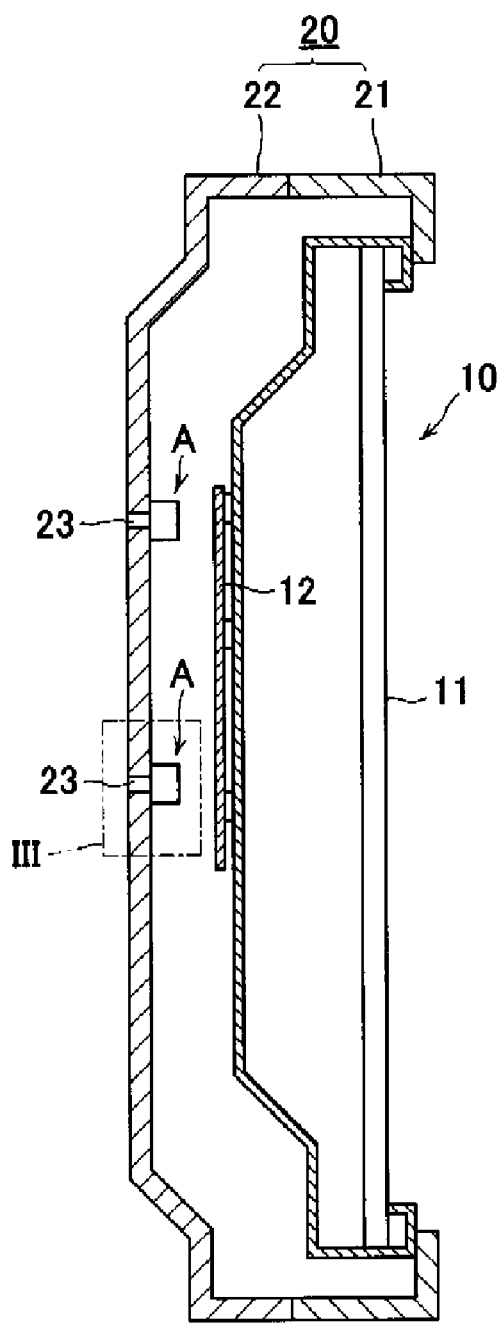
FIG. 2 is a cross sectional view of the flat-screen television set taken along II-II line in FIG. 1.

Referring to FIGS. 1 to 9, a flat-screen television set 1 having a plurality of mount structures A (e.g., cabinet structure assembly) in accordance with one embodiment will be described. As illustrated in FIGS. 1 and 2, the flat-screen television set 1 includes a liquid crystal module 10 with a liquid crystal panel 11 and a wiring board 12, a cabinet 20 and a plurality of (four in FIG. 1) attachment members 30. The liquid crystal module 10 is housed within the cabinet 20.

Specifically, the liquid crystal panel 11 and the wiring board 12 are disposed within the cabinet 20. The cabinet 20 has a front cabinet 21 and a rear cabinet 22 with a plurality of (four in FIG. 1) circular openings 23 (e.g., through-hole). The front and rear cabinets 21 and 22 define an inside of the cabinet 20 therebetween. The attachment members 30 are provided at four places in a middle part of a wall of the rear cabinet 22. The mount structures A are provided for detachably mounting the attachment members 30 to the rear cabinet 22. In this embodiment, the mount structures A is applied to the flat-screen television set 1. However, the mount structure A can also be applied to other image display devices that can be hung on a wall.

Figure 3:
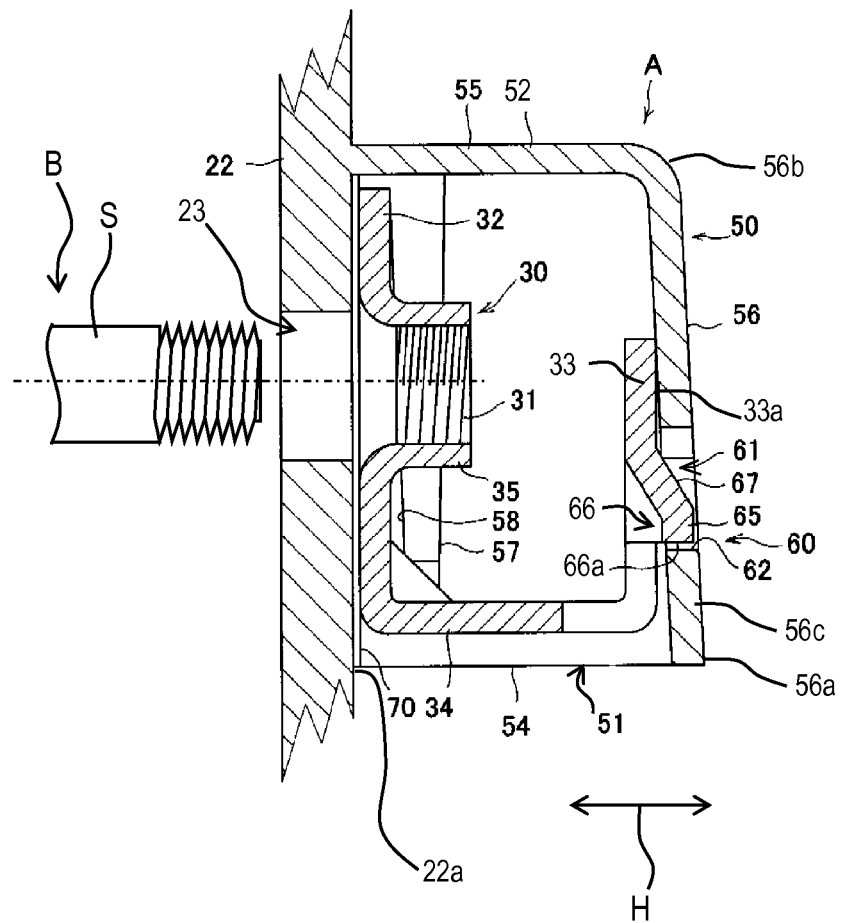
FIG. 3 is an enlarged cross sectional view illustrating the mounting structure in a bounded area III of the flat-screen television set illustrated in FIG. 2, with the mounting structure having a cover and an attachment member disposed within the cover.

As illustrated in FIG. 3, each of the attachment members 30 has a threaded hole 31. The attachment members 30 are made of sheet metal. The attachment members 30 are mounted to the rear cabinet 22 such that the threaded holes 31 are aligned with the circular openings 23 of the rear cabinet 22, respectively. The attachment members 30 are couple to wall brackets B with fasteners, such as screws S. The wall brackets B are fixedly coupled to a wall. The fasteners are threaded into the threaded holes 31 of the attachment members 30, respectively. As illustrated in FIGS. 1 and 2, the attachment members 30 are positioned opposite the wiring board 12 of the liquid crystal module 10, respectively. The rear cabinet 22 further includes a plurality of (four in this embodiment) covers 50 (e.g., attachment cover). The attachment members 30 are disposed within the covers 50, respectively. In particular, each of the attachment members 30 is entirely covered by a corresponding one of the covers 50. The covers 50 are made of an electrostatic shielding material, such as plastic. The covers 50 are integrally formed with the rear cabinet 22 as a one-piece, unitary member. The cabinet 20, the attachment member 30 and the cover 50 mainly form the mount structure A (e.g., cabinet structure assembly). The attachment members 30 are identical to each other. Thus, hereinafter, only one of the attachment members 30 (i.e., attachment member 30) will be described in detail. Furthermore, the covers 50 are also identical to each other. Thus, hereinafter, only one of the covers 50 (i.e., cover 50) will be described in detail.

Figure 4:
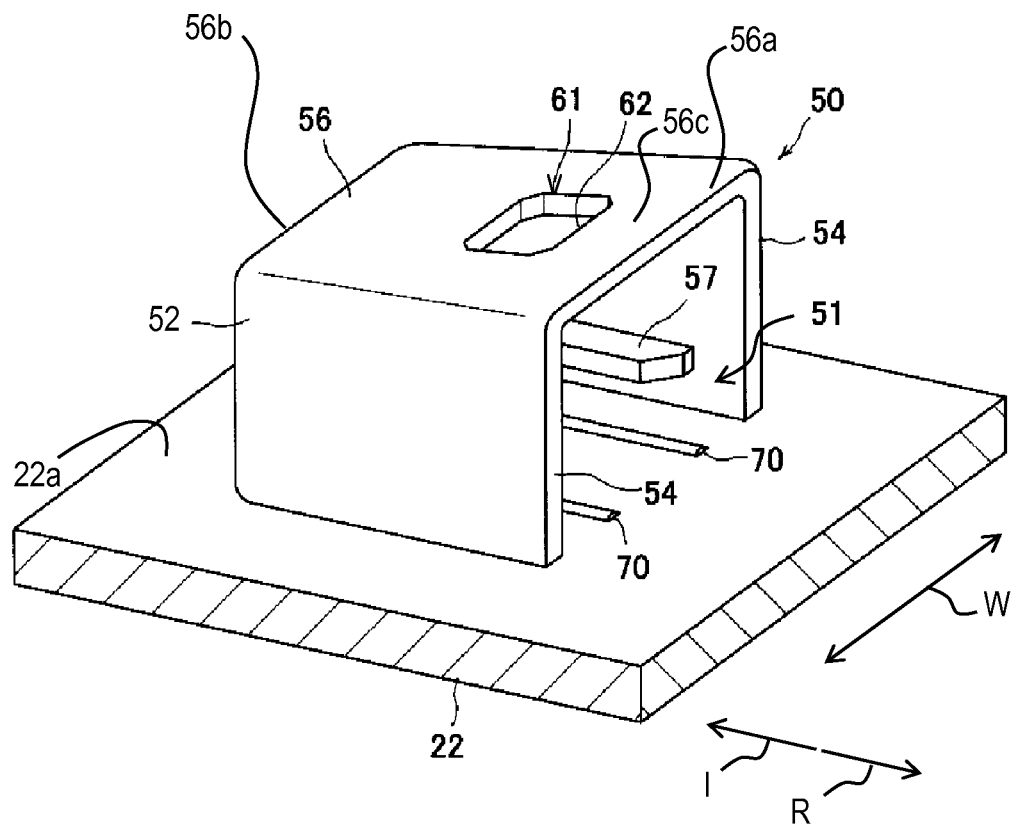
FIG. 4 is a partial perspective view of the cover of the mount structure illustrated in FIG. 3.
Figure 6:
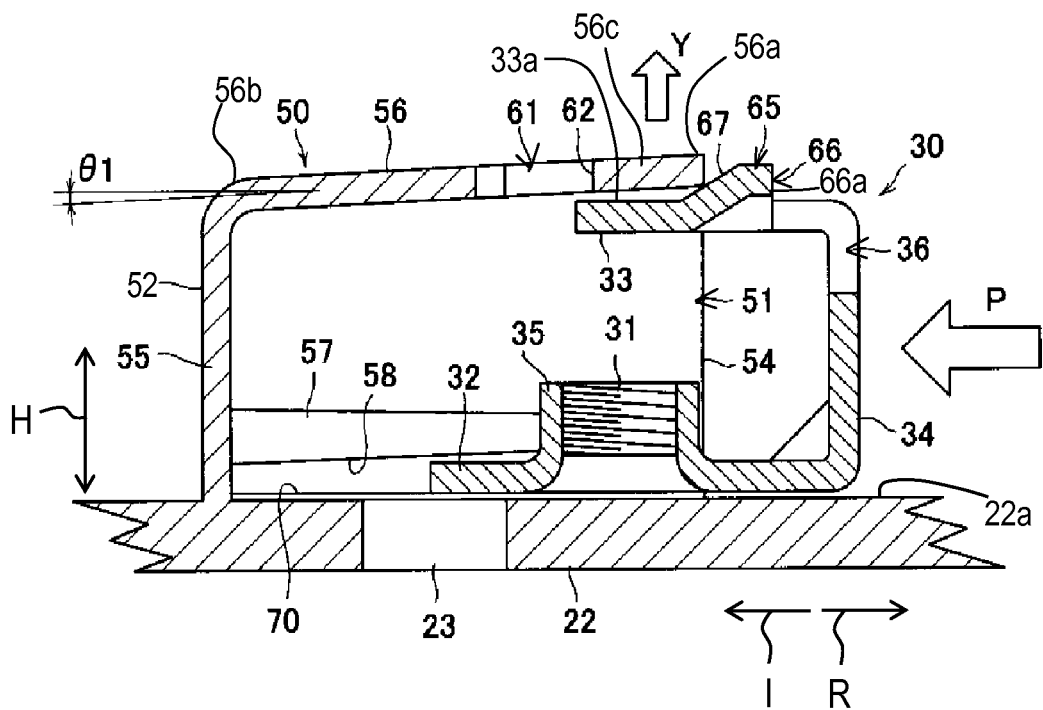
FIG. 6 is a cross sectional view of the mount structure illustrated in FIG. 3, illustrating that the attachment member is inserted into the cover during an assembly procedure of the mount structure.

As illustrated in FIG. 4, the cover 50 is a hood-shaped enclosure. Specifically, the cover 50 includes an opening 51 (e.g., access opening) through which the attachment member 30 is inserted into and removed from the cover 50. The cover 50 further includes a side wall component 52 (e.g., side wall portion) with left and right wall portions 54 and a back side wall portion 55, and a top component 56 (e.g., top wall portion). The opening 51 is formed at one place of the side wall component 52. Specifically, the opening 51 is disposed opposite the back side wall portion 55. The left and right wall portions 54 and the back side wall portion 55 are linked in a U-shape. The side wall component 52 extends substantially vertically on an inner face 22a of a wall of the rear cabinet 22 between the inner face 22a of the rear cabinet 22 and the top component 56. The top component 56 has an inside face that faces the inner face 22a of the rear cabinet 22. As illustrated in FIG. 6, the top component 56 is sloped so as to have a gradient θ1 that rises toward the opening 51 in the cover 50. Specifically, the top component 56 is sloped relative to the inner face 22a of the rear cabinet 22 such that a spacing between the rear cabinet 22 and the top component 56 measured in a height direction H (e.g., first direction) of the cover 50 gradually increases as moving closer to the place where the opening 51 is formed from a place near the back side wall portion 55, and becomes greatest at the place where the opening 51 is formed. In other words, the spacing between the inner face 22a of the rear cabinet 22 and the inside face of the top component 56 decreases as approaching from a first edge portion 56a of the top component 56 to a second edge portion 56b of the top component 56. The first edge portion 56a forms an edge of the opening 51 of the cover 50. The second edge portion 56b is opposite the first edge portion 56a. Furthermore, the height direction H of the cover 50 is perpendicular to the inner face 22a of the rear cabinet 22. The top component 56 further has a recess 61 (e.g., engagement recess) with a through-hole in a middle part of the top component 56 in a widthwise direction W of the cover 50. The recess 61 of the cover 50 is disposed closer to the first edge portion 56a than the second edge portion 56b. The widthwise direction W of the cover 50 being perpendicular to the height direction H of the cover 50. The widthwise direction W of the cover 50 extends along the first edge portion of the top component 56 that forms an edge of the opening 51 of the cover 50. Moreover, hereinafter, a direction perpendicular to both the widthwise direction W and the height direction H is defined as a depth direction of the cover 50. Specifically, a direction from the first edge portion 56a to the second edge portion 56b along the depth direction is defined as an insertion direction I of the cover 50, and a direction opposite the insertion direction I is defined as a removal direction R of the cover 50.

Figure 5:
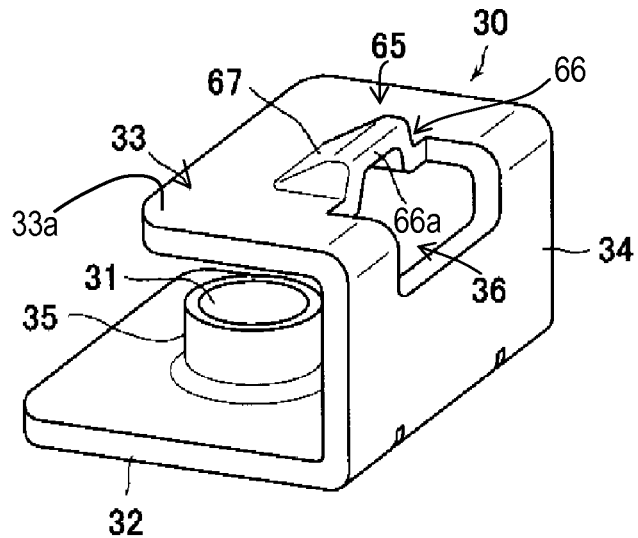
FIG. 5 is a perspective view of the attachment member of the mount structure illustrated in FIG. 3.

As shown in FIG. 5, the attachment member 30 is formed in a U-shape in side view. The attachment member 30 has a base piece 32 (e.g., base plate), a plate piece 33 (e.g., top plate) and a middle piece 34 (e.g., middle plate). The plate piece 33 is arranged relative to the base piece 32. Specifically, the plate piece 33 is opposite the base piece 32 with a specific distance therebetween. The middle piece 34 extends between back end portions of the base piece 32 and the plate piece 33 such that the middle piece 34 links the back end portions of the base piece 32 and the plate piece 33. The base piece 32 further has a short, boss-shaped tubular part 35. The tubular part 35 protrude towards an inside of the attachment member 30 defined between the base piece 32 and the plate piece 33. In other words, the tubular part 35 protrudes towards the plate piece 33. The tubular part 35 is formed by burring of the base piece 32. The threaded hole 31 is formed by cutting threads in an inner peripheral face of the tubular part 35. The plate piece 33 has a protrusion 65 (e.g., engagement protrusion). The protrusion 65 is formed by cutting and lifting in a middle part of the plate piece 33 in a widthwise direction of the attachment member 30 that is parallel to the widthwise direction W of the cover 50 when the attachment member 30 is disposed within the cover 50. This protrusion 65 is serrated in the side view. The protrusion 65 has an engagement component 66 with an end face 66a (e.g., second engagement face) and a guide face 67. The end face 66a is disposed at an end portion of the protrusion 65 in the removal direction R. The end face 66a is lifted substantially vertically from a top surface 33a (e.g., top face) of the plate piece 33. The end face 66a of the protrusion 65 is disposed closer to the back end portion (e.g., first end portion) of the plate piece 33 than a front end portion (e.g., second end portion) of the plate piece 33. The back end portion is opposite the front end portion. The front end portion forms a free end of the plate piece 33. The end face 66a of the engagement component 66 engages with a side face 62 (e.g., first engagement face) of the recess 61 provided to the top component 56 on the cover 50. The protrusion 65 protrudes relative to the top surface 33a away from the base piece 32. The guide face 67 has a sloped face that is sloped relative to the top surface 33a of the plate piece 33. The guide face 67 forwardly and downwardly extends toward the top surface 33a of the plate piece 33 from a top portion the engagement component 66. The guide face 67 is formed on the protrusion 65. This guide face 67 slides on the top component 56 of the cover 50 in the course of inserting the attachment member 30 into the cover 50. Furthermore, the guide face 67 guides the cover 50 such that the engagement component 66 of the protrusion 65 is guided into the recess 61 of the cover 50 while elastically deforming the top component 56.

Figure 7:
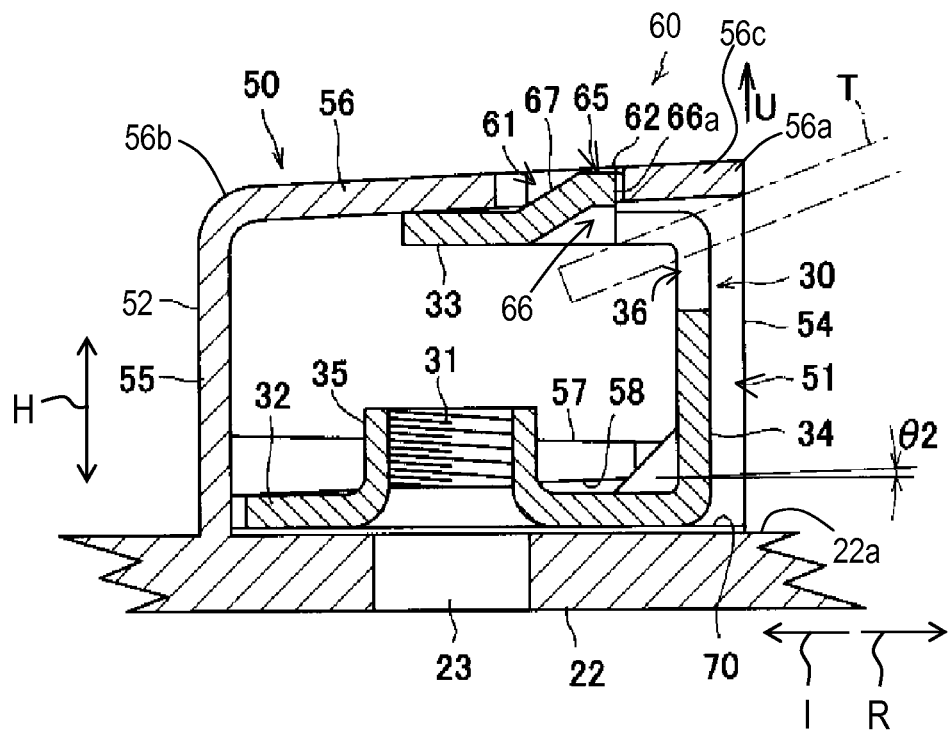
FIG. 7 is a cross sectional view of the mount structure illustrated in FIG. 3, illustrating that the assembly procedure of the mount structure is completed and the attachment member is fitted to the cover.

The protrusion 65 on the attachment member 30 and the recess 61 on the cover 50 form an engagement mechanism 60 that prevents the attachment member 30 from coming out of the opening 51 once inserted into the cover 50 through the opening 51 (see FIGS. 3 and 7).

Next, an assembly procedure for attaching the attachment member 30 to the cover 50 will be described through reference to FIGS. 6 and 7.

At a first stage of this procedure, as shown in FIG. 6, the base piece 32 of the attachment member 30 is oriented toward the inner face 22a of the rear cabinet 22. The plate piece 33 is oriented toward the top component 56 of the cover 50. The front end portion of the attachment member 30 is inserted into the opening 51 of the cover 50 as shown in FIG. 6. The insertion work here can be easily carried out, with no skill required, since the top component 56 of the cover 50 is sloped so as to have a gradient θ1 that rises toward the opening 51, and the opening 51 is sufficiently large relative to the attachment member 30.

At the next stage, the middle piece 34 of the attachment member 30 is pushed with a finger or the like as shown by an arrow P in FIG. 6 along the insertion direction I of the cover 50, which pushes the attachment member 30 into the interior of the cover 50. This pushing slides the base piece 32 of the attachment member 30 over the inner face 22a of the rear cabinet 22. As a result, the guide face 67 of the protrusion 65 of the attachment member 30 hits an end plate portion 56c (e.g., end part) of the top component 56 of the cover 50 as shown in FIG. 6 that is disposed between the recess 61 and the opening 51. Then, the guide face 67 slides on the top component 56 of the cover 50, and elastically deforms the end plate portion 56c of the top component 56 against the elasticity of the end plate portion 56c away from the top surface 33a of the plate piece 33 and the inner face 22a of the rear cabinet 22 as indicated by an arrow Y while guiding the protrusion 65 into the recess 61 of the top component 56. Accordingly, the end plate portion 56c of the top component 56 returns under elastic force to its original position. As a result, the engagement component 66 of the protrusion 65 is also guided into the recess 61 as shown in FIG. 7, and the end face 66a of the engagement component 66 faces the side face 62 of the recess 61 in a state of contact or non-contact. When the attachment member 30 is installed into the cover 50, the top surface 33a contacts an inner surface of the top component 56. In other words, the attachment member 30 is attached to the cover 50 in a loaded or compressed state, and sandwiched between the inner face 22a of the rear cabinet 22 and the inner surface of the top component 56. However, the attachment member 30 can be disposed within the cover 50 in an unloaded-state or uncompressed-state. in this case, the top surface 33a of the plate piece 33 does not contact with the inner surface of the top component 56.

As described above, the assembly procedure of the attachment member 30 to the rear cabinet 22 can be finished in a single step of inserting the attachment member 30 into the cover 50. Accordingly, there is no need to use a separate attachment screw or to use a separate box-shaped cover as in the conventional structures. Accordingly, the number of parts required can be correspondingly reduced, and the assembly procedure is also simplified.

As shown in FIG. 7, when the attachment member 30 has been mounted to the rear cabinet 22, even if the attachment member 30 should rattle inside the cover 50, or the attachment member 30 should be strongly pulled in a direction of coming loose from the opening 51 along the removal direction R, since the end face 66a of the engagement component 66 of the protrusion 65 engages with the side face 62 of the recess 61, it is unlikely that the attachment member 30 will come loose from the cover 50. In other words, the action of the engagement mechanism 60 formed by the recess 61 and the protrusion 65 reliably prevents the attachment member 30 from coming out of the cover 50.

In particular, the engagement component 66 of the protrusion 65 is lifted substantially vertically from the top surface 33a of the plate piece 33. Thus, even if the attachment member 30 is pulled strongly in the direction of coming out of the opening 51 along the removal direction R, it will be unlikely that the engagement component 66 will push up and deform the top component 56 of the cover 50 and come out of the recess 61. As a result, as discussed above, the action of the engagement mechanism 60 effectively prevents the attachment member 30 from coming out of the cover 50. This is an advantage of providing the engagement component 66 that is lifted substantially vertically from the top surface 33a of the plate piece 33.

When the attachment member 30 is removed from the cover 50, a screwdriver or some other rod-shaped tool T or the like, indicated by an imaginary line in FIG. 7, for example, is used to bend the end plate portion 56c of the top component 56 of the cover 50. The tool T is used to manually raise the end plate portion 56c in a direction of an arrow U against the elastic force of the end plate portion 56c, thereby disengaging the engagement component 66 of the protrusion 65 from the recess 61. Doing this releases the engaged state of the engagement mechanism 60 and allows the attachment member 30 to be taken out of the cover 50. In this embodiment, as shown in FIG. 5, the attachment member 30 has an opening 36 (e.g., aperture) formed at a corner formed by the plate piece 33 and the middle piece 34 of the attachment member 30. The protrusion 65 is disposed adjacent to the opening 36 such that the end face 66a of the engagement component 66 forms a part of a peripheral edge that defines the opening 36. When the tool T is used to lift and bend the top component 56 of the cover 50 in the direction of the arrow U, the tool T can be inserted into the opening 36. Therefore, when the top component 56 is lifted with the tool T, the tool T can be inserted by a sufficient length into the cover 50. As a result, there is no risk that the tip of the tool T will slip off the top component 56 and scratch or otherwise damage the top component 56.

As shown in FIG. 4, the cover 50 further has a pair of hold-down ribs 57 (e.g., rib portions). The hold-down ribs 57 are integrally formed on inner surfaces of the left and right wall portions 54 of the cover 50, respectively (only one of the hold-down ribs 57 on the right wall component is shown in FIG. 4). The hold-down ribs 57 extend from the back side wall portion 55 of the cover 50 toward the opening 51 in the depth direction of the cover 50. As shown in FIG. 7, these hold-down ribs 57 sandwich the base piece 32 of the attachment member 30, which has been inserted into the cover 50 and locked in place by the engagement mechanism 60, between themselves and the rear cabinet 22. Accordingly, the pressing action of the hold-down ribs 57 prevents the attachment member 30 from lifting up or rattling inside the cover 50. The hold-down ribs 57 have contact faces 58 that contact with the base piece 32, respectively. The contact faces 58 are formed as sloped faces having a gradient 82 that rises toward the opening 51 with respect to the inner face 22a of the rear cabinet 22. On innermost side of the interior of the cover 50, the spacing between the contact faces 58 and the inner face 22a of the rear cabinet 22 is slightly smaller than the thickness of the base piece 32. On the opening 51 side of the cover 50, this spacing is set to be slightly larger than the thickness of the base piece 32. In other words, the contact faces 58 is sloped relative to the inner face 22a of the rear cabinet 22 such that a spacing between the contact face 58 and the inner face 22a measured in the height direction H decreases as approaching from first longitudinal ends of the hold-down ribs 57 to second longitudinal ends of the hold-down ribs 57, respectively. The first longitudinal ends are located closer to the opening 51 of the cover 50 than the second longitudinal ends, respectively. Therefore, when the attachment member 30 is inserted into the cover 50, the front end of the base piece 32 is squeezed between the contact faces 58 and the inner face 22a of the rear cabinet 22. Thus, the attachment member 30 can be prevented from lifting up relative to the inner face 22a or rattling within the cover 50. Furthermore, when the attachment member 30 is first inserted into the cover 50, the base piece 32 can be inserted more easily between the contact faces 58 and the inner face 22a of the rear cabinet 22.

In the embodiment described above, static electricity released from the attachment member 30 is confined by the electrostatic shielding function of the cover 50 that covers substantially the entire attachment member 30. However, static electricity released from the portion not covered by the cover 50, namely, the middle piece 34 of the attachment member 30 across from the opening 51 of the cover 50, or the protrusion 65 of the attachment member 30 fitted into the recess 61 (e.g., through-hole) of the cover 50, will be released to the outside of the cover 50 without being blocked by the cover 50. Accordingly, it is preferable to employ some means for reducing as much as possible the size of the prohibited region where no control circuit is provided to the wiring board 12 (see FIG. 2) by minimizing the amount of static electricity released from the opening 51 or the recess 61. Beneficial ways to achieve this will now be described through reference to FIGS. 8 to 11.

Figure 8:
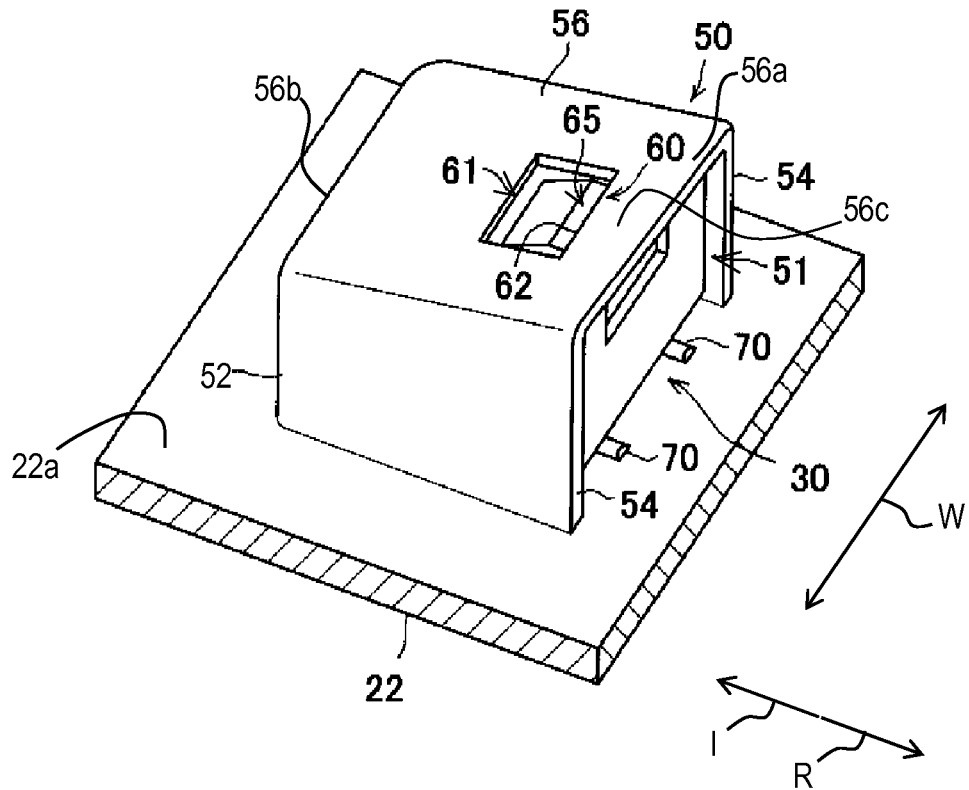
FIG. 8 is a partial perspective view of the mount structure illustrated in FIG. 3, illustrating that the attachment member is fitted to the cover.
Figure 9:
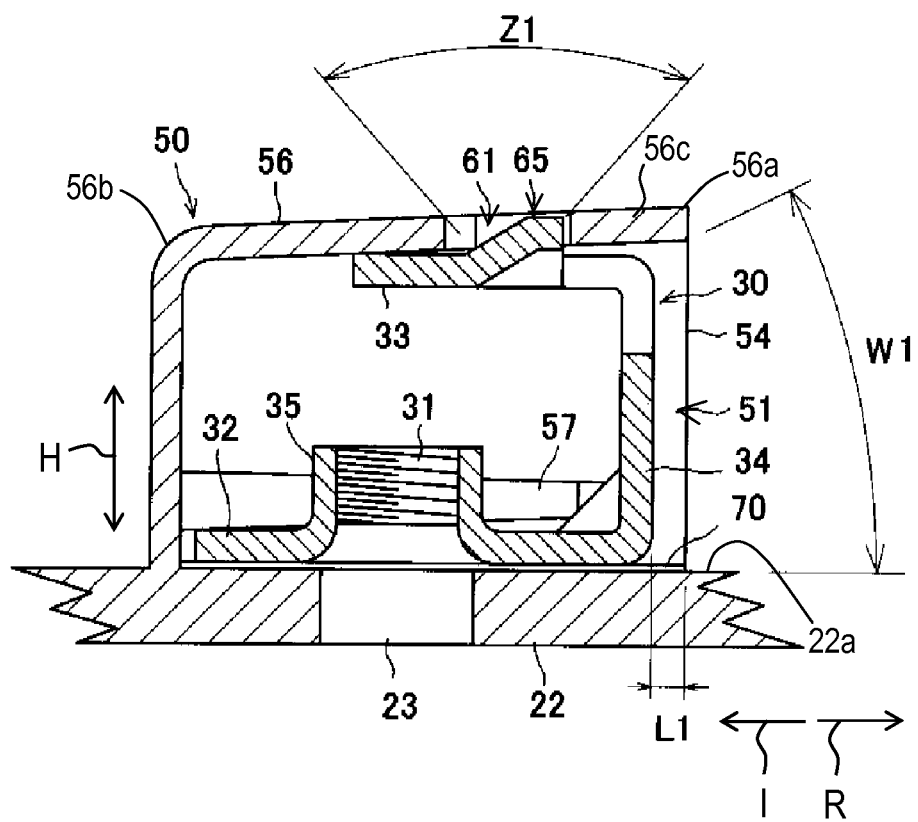
FIG. 9 is a cross sectional view of the mount structure illustrated in FIG. 3, illustrating radiation region of static electricity from the attachment member.

As shown in FIGS. 8 and 9, with the mount structure A, the enclosure that forms the cover 50 is extended in the removal direction R of the cover 50 to a position rearward of the attachment member 30 that has been inserted into the cover 50. As shown in FIG. 9, the cover 50 sticks out from the middle piece 34 of the attachment member 30 by a distance L1 in the removal direction R. In other words, the opening 51 has a peripheral edge that is disposed in the removal direction R of the cover 50 relative to the back end portion of the plate piece 33. The back end portion of the plate piece 33 is located in the removal direction R of the cover 50 relative to the front end portion of the plate piece 33. When the cover 50 sticks out rearward of the mount structure A relative to the middle piece 34 of the attachment member 30, the opening 51 of the cover 50 will be positioned more to the rear than the middle piece 34 at the back end portion of the attachment member 30. Thus, a radiation region W1 of static electricity around the middle piece 34 of the attachment member 30 will be limited by the top component 56 and the left and right wall portions 54 of the cover 50. Therefore, if, as shown in FIG. 9, the cover 50 sticks out rearward by the distance L1 from the middle piece 34 of the attachment member 30, the radiation region W1 of static electricity will be reduced or confined to a range corresponding to the distance L1. Specifically, as shown in FIG. 9, the radiation region W1 of static electricity in an up and down direction (e.g., height direction H of the cover 50) can be reduced by the cover 50.

Furthermore, the recess 61 of the cover 50 is formed by a through-hole made in the top component 56. Thus, a radiation region Z1 of static electricity released from the place where the protrusion 65 of the attachment member 30 is formed will be a range corresponding to an opening width of the recess 61. Specifically, as shown in FIG. 9, the radiation region Z1 in the forward and backward direction (the depth direction and the widthwise direction W of the cover 50) can be reduced by the recess 61 of the cover 50.

Figure 10:
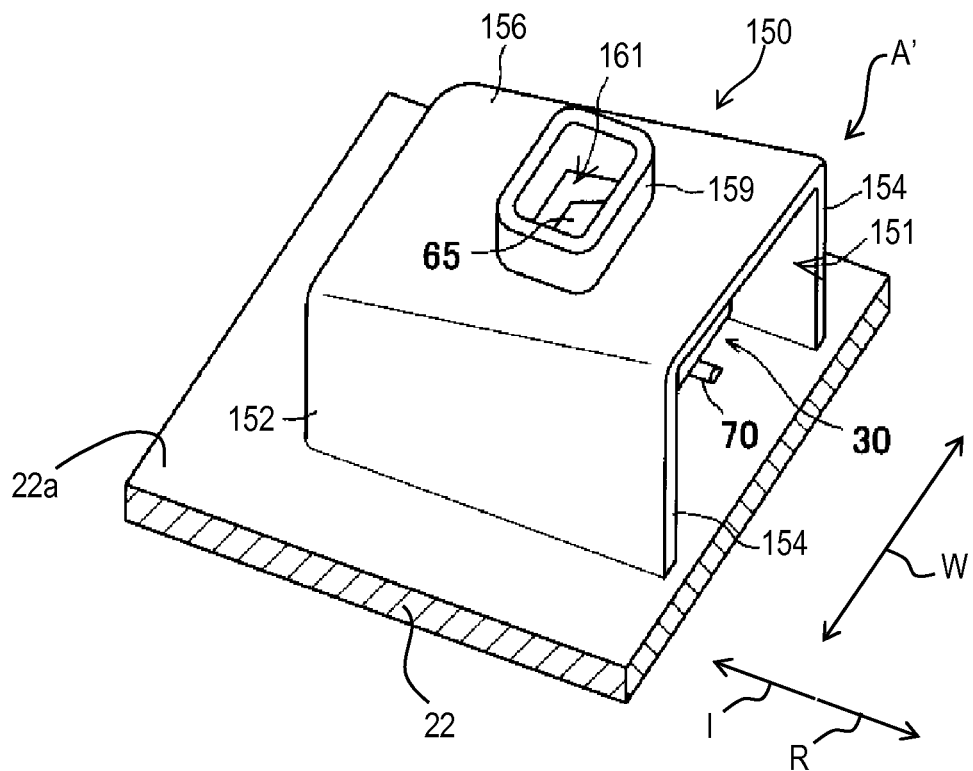
FIG. 10 is a partial perspective view of a mount structure in accordance with a modified embodiment, illustrating that an attachment member is fitted to a cover.
Figure 11:
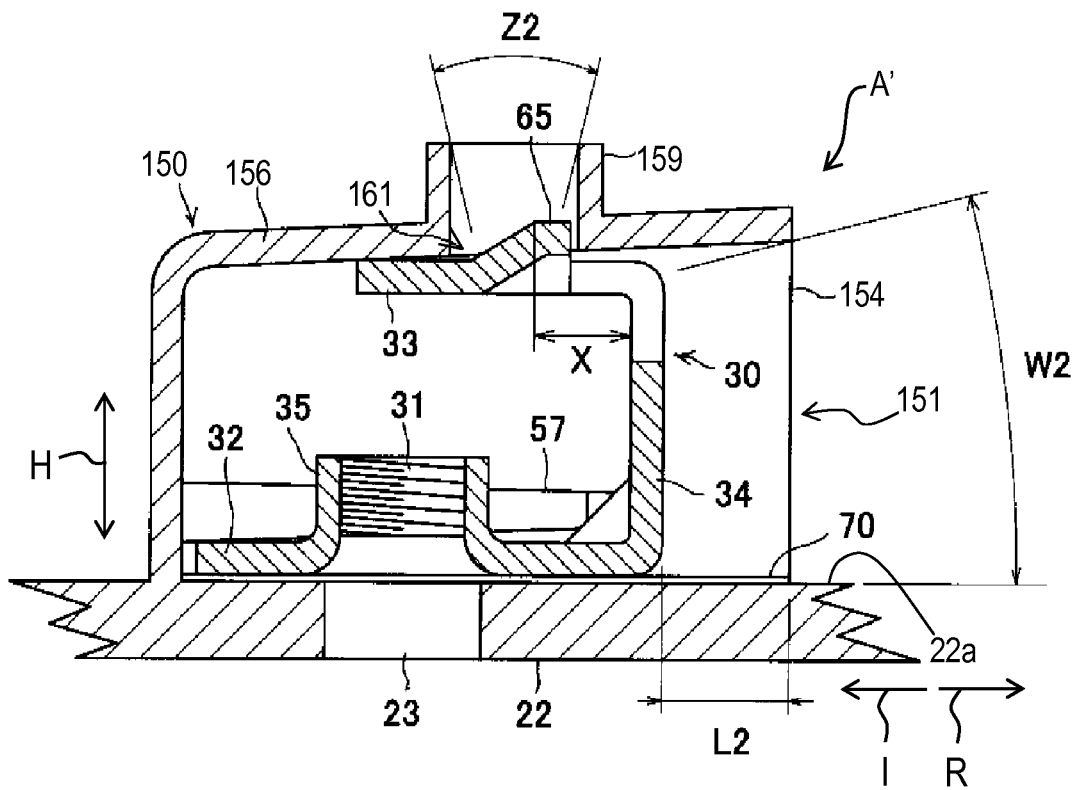
FIG. 11 is a cross sectional view of the mount structure illustrated in FIG. 10, illustrating radiation region of static electricity from the attachment member.

The radiation of the static electricity can be further reduced with a mount structure A' of a modified embodiment shown in FIGS. 10 and 11. In view of the similarity between the mount structure A shown in FIGS. 1 to 9 and the mount structure A' shown in FIGS. 10 and 11, the parts of the mount structure A' that are identical to the parts of the mount structure A will be given the same reference numerals as the parts of the mount structure A. Also, parts of this mount structure A' that are functionally identical and/or substantially identical to parts of the mount structure A will be given the same reference numerals but with "100" added thereto. In any event, the descriptions of the parts of the mount structure A' that are substantially identical to the parts of the mount structure A may be omitted for the sake of brevity. However, it will be apparent to those skilled in the art from this disclosure that the descriptions and illustrations of the mount structure A also apply to this mount structure A', except as discussed and/or illustrated herein.

As shown in FIGS. 10 and 11, the enclosure forming a cover 150 sticks out rearward relative to the middle piece 34 of the attachment member 30 by a distance L2 that is greater than the distance L1 in FIG. 9. Furthermore, the cover 150 further has a tubular part 159 that extends outside of the cover 150. In other words, the tubular part 159 protrudes away from the inner face 22a of the rear cabinet 22. The tubular part 159 is integrally and contiguously provided to the edge of a through-hole forming a recess 161 of a top component 156 of the cover 150. The tubular part 159 has an inner peripheral face defining a through-hole that extends thorough the top component 156. As shown in FIG. 11, the cover 50 sticks out from the middle piece 34 of the attachment member 30 by the distance L2, and this distance L2 is greater than the distance L1 shown in FIG. 9. This increase of the distance L2 can further limit a radiation region W2 of static electricity around the middle piece 34 of the attachment member 30 by a top component 156 and left and right wall portions 154 of the cover 150 compared to the mount structure A shown in FIG. 9. Specifically, as shown in FIG. 11, the radiation region W2 of static electricity in the up and down direction (e.g., height direction H of the cover 150) can be reduced by the cover 150. Thus, the greater are the distances L1 and L2 shown in FIGS. 9 and 11, the more the static electricity radiation region will be limited to a narrow range by the covers 50 and 140, which is beneficial in that the size of the prohibited region of the wiring board 12 can be kept smaller.

Furthermore, as shown in FIGS. 10 and 11, the plastic tubular part 159 is contiguously provided to the edge of the through-hole forming the recess 161 in the top component 156 of the cover 150. This tubular part 159 serves to reduce a radiation region Z2 of static electricity released from the recess 161. Specifically, as shown in FIG. 11, the radiation region Z2 of static electricity in the forward and backward direction (e.g., widthwise direction W and depth direction of the cover 150) can be confined by the tubular part 159. This radiation region Z2 is smaller or narrower than the radiation region Z1 shown in FIG. 9. Thus, contiguously providing the plastic tubular part 159 to the edge of the through-hole forming the recess 161 in the top component 156 of the cover 150 as shown in FIG. 11 is beneficial in terms of reducing the radiation region Z2 of static electricity released from the recess 161. As a result, the size of the prohibited region of the wiring board 12 can be kept smaller. Instead of providing the tubular part 159, it is also possible to seal off the recess 161 with plastic. In this case, a complicated mold will be needed to form the recess 161 by integrally molding the cover 150 from plastic along with the rear cabinet 22. This drives up the molding cost. However, higher static electricity shielding property can be obtained.

In the course of assembling the mount structure A, as described through reference to FIGS. 6 and 7, the guide face 67 of the protrusion 65 of the attachment member 30 slides on the top component 56 of the cover 50, and elastically deforms this top component 56 in the step of inserting the attachment member 30 into the cover 50. Thus, the attachment member 30 can be very easily inserted into the cover 50 with minimal force because the plate piece 33 provided to the sheet metal attachment member 30 is stiffer than the end plate portion 56c of the top component 56 of the cover 50. In particular, this can occur when the top component 56 of the cover 50 has the property of elastically deforming more readily than the plate piece 33 of the attachment member 30. In view of this, in order to reliably produce such conditions, the protrusion 65 of the attachment member 30 is formed by being cut and lifted at a place near the rear end of the plate piece 33, which shortens as much as possible a spacing X between the protrusion 65 of the attachment member 30 and the rear end of the plate piece 33 (e.g., the spacing between the protrusion 65 and the middle piece 34). With this arrangement, the sheet metal attachment member can have high stiffness, and in addition to this, the distance (corresponding to the spacing X) from the fulcrum (the back end portion of the plate piece 33) to the action point (the place where the protrusion 65 is formed) can be shorter when the plate piece 33 is deformed. Thus, a situation can be reliably produced in which the top component 56 is elastically deformed.

As mainly shown in FIG. 4, dimensional adjustment of the attachment member 30 and the cover 50 is performed by providing a plurality of ribs 70 that are short in height on the inner face 22a of the rear cabinet 22. The ribs 70 extend parallel to each other in the depth direction of the cover 50. Furthermore, the mount structures A and A' are applied to a flat-screen television set, but can also be applied to other kinds of electric devices hung on a wall.

With the mount structures A and A', it is possible to provide a mount structure for the wall bracket attachment member 30 with which assembly work is easier than in the conventional structures and the assembly process entails a single step. Furthermore, the attachment member 30, once assembled, can be easily removed. Moreover, there is no need for the separate formation of a box-shaped cover as in the conventional structures. Thus, the assembly procedure is simplified and fewer parts are required. Moreover, despite this, it is possible to reduce the size of the prohibited region in which there is no control circuit on the wiring board 12.

With the mount structure A, the attachment member 30 is made of sheet metal and is coupled to the wall bracket B. The attachment member 30 is mounted to the plastic cabinet 20 at a position opposite the wiring board 12 that is provided on the inside of this cabinet 20. The threaded hole 31 is provided to the attachment member 30. The threaded hole 31 faces the opening 23 of the cabinet 20. The attachment member 30 is covered with the cover 50 that has an electrostatic shielding function and is molded from plastic integrally with the cabinet 20.

The cover 50 is a hood-shaped enclosure that has the side wall component 52 and the top component 56. The cover 50 has the opening 51 that allows the attachment member 30 to be passed through. The opening 51 is formed at one location of the side wall component 52. There is provided the engagement mechanism 60 that prevents the attachment member 30 that has been inserted through the opening 51 and into the cover 50 from coming out of the opening 51. This engagement mechanism 60 has the recess 61 provided in the top component 56 of the cover 50 and the protrusion 65 that is serrated in side view and is provided to the attachment member 30. The protrusion 65 engages with this recess 61.

Also, the protrusion 65 has the engagement component 66 that is formed by cutting and lifting the plate piece 33 of the attachment member 30. The engagement component 66 is fitted into the recess 61 and faces the side face 62 of the recess 61 in the depth direction in which the attachment member 30 is removed from the cover 50. The protrusion 65 further has the guide face 67 that slides on the top component 56 of the cover 50 in the course of inserting the attachment member 30 into the cover 50 and deforms elastically while guiding the engagement component 66 to the recess 61. The engagement component 66 is formed by the end face 66a of the protrusion 65 lifted up from the top surface 33a of the plate piece 33.

With the mount structure A, the threaded hole 31 is provided to the attachment member 30. The threaded hole 31 is utilized to screw the wall bracket B to the attachment member 30 with an integrated attachment bolt or with an attachment bolt that is separate from the wall bracket B. Also, the attachment member 30 is made of sheet metal, and is covered with a cover 50 that has an electrostatic shielding function. Thus, the spacing between the attachment member 30 and the wiring board 12 can be shorter. As a result, a television set or other such image display device equipped with this mount structure A can be made thinner.

With this mount structure A, the attachment member 30 that has been inserted into the cover 50 through the opening 51 is prevented from coming out of this opening 51. Furthermore, this mount structure A can be assembled in a single step in which the attachment member 30 is inserted into the cover 50 that is formed from plastic and integrally with the cabinet 20. In particular, the engagement mechanism 60 has the recess 61 on the cover 50 and the protrusion 65 that is serrated in side view on the attachment member 30. Thus, there is no need for a separate attachment screw as in the conventional structures as a means for mounting the cover 50 to the cabinet 20. Furthermore, there is no need for a separate box-shaped cover as in the conventional structures.

In particular, the protrusion 65 has the engagement component 66 that is formed by cutting and lifting the plate piece 33 of the attachment member 30 and that faces the side face 62 of the recess 61 of the cover 50. This engagement component 66 is formed by the end face 66a of the protrusion 65 lifted up from the top surface 33a of the plate piece 33. Consequently, even if the attachment member 30 is pulled strongly in the removal direction R of removing it from the cover 50, this will not cause the engaged state between the protrusion 65 and the recess 61 to be released, and the attachment member 30 to come out of the cover 50. Accordingly, there is no risk that the attachment member 30 will accidentally fall out of the cover 50 during transport of the image display device or when the image display device is put on the floor, etc. On the other hand, when the attachment member 30 is to be removed from the cover 50, the user bends the top component 56 of the cover 50 against its elastic force, and disengages the protrusion 65 from the recess 61, which allows the attachment member 30 to be removed from the cover 50. In the course of inserting the attachment member 30 into the cover 50, the guide face 67 of the protrusion 65 will serve to guide the engagement component 66 of the protrusion 65 into the recess 61 of the top component 56 while elastically deforming the top component 56 of the cover 50. Thus, assembling the mount structure A becomes a job that requires no skill, involving merely inserting the attachment member 30 into the cover 50.

With the mount structure A, the attachment member 30 is preferably formed in a U-shape in side view (e.g., as viewed in the widthwise direction W). Specifically, the attachment member 30 has the base piece 32 that has the threaded hole 31, the plate piece 33 that is opposite this base piece 32, and the middle piece 34 that links the back end portions of the base piece 32 and the plate piece 33. Furthermore, the cover 50 has the recess 61 in the top component 56. The top component 56 is sloped so as to have the gradient $\theta 1$ rising toward the opening 51 with respect to the inner face 22a of the cabinet 20. With this arrangement, the attachment member 30 is formed in a simple shape (i.e., U shape in side view). Thus, the attachment member 30 can be produced easily. Also, the top component 56 of the cover 50 is sloped so as to have the gradient $\theta 1$ rising toward the opening 51. Thus, another advantage is that the attachment member 30 can be easily inserted through the opening 51 into the interior of the cover 50.

With the mount structure A, it is preferable that the cover 50 is provided with the hold-down ribs 57 that come into contact with the base piece 32 of the attachment member 30 and prevent it from rising. With this arrangement, the attachment member 30 that has been assembled with the cover 50 will not lift up in the interior of the cover 50. Accordingly, even if the image display device is put on the floor, there will be little buzzing noise produced by speaker output.

With the mount structure A, it is preferable that the contact faces 58 of the hold-down ribs 57 that contact with the base piece 32 are formed as sloped faces. The sloped faces have the gradient 82 rising toward the opening 51 with respect to the inner face 22a of the rear cabinet 22. With this arrangement, the attachment member 30 will be easier to insert through the opening 51 of the cover 50 into the interior of the cover 50.

With the mount structure A, it is preferable that the spacing is set between the protrusion 65 of the attachment member 30 and the back end portion of the plate piece 33 such that the guide face 67 slides on the top component 56 of the cover 50 and elastically deforms the top component 56. With this arrangement, the thickness of the sheet metal forming the plate piece 33 of the attachment member 30 is not that important. The stiffness of the plate piece 33 can be easily increased over that of the top component 56 of the cover 50, which needs to be elastically deformable.

With the mount structure A, the sheet metal attachment member 30 is covered with the cover 50 that has an electrostatic shielding function. Thus, even if the spacing between the wiring board 12 and the attachment member 30 is shortened, it will still be possible to reduce the size of the prohibited region in which there is no control circuit on the wiring board 12. On the other hand, the cover 50 has the opening 51 on its side wall component 52. Thus, the electrostatic shielding function provided by the cover 50 is lost at the place where this opening 51 is formed.

To improve this point and reduce the size of the prohibited region on the wiring board, with the mount structures A and A', the enclosure forming the covers 50 and 150 extend to a position rearward of the attachment member 30 when the attachment member 30 has been inserted into the covers 50 and 150. With this arrangement, it will be possible to reduce the size of the radiation regions W1 and W2 over which static electricity discharged from the openings 51 and 151 of the covers 50 and 150, respectively. Thus, the prohibited region of the wiring board 12 can be reduced in size correspondingly. Furthermore, the recess 61 is formed by a through-hole made in the top component 56 of the cover 50 (or top component 156 of the cover 150). In terms of reducing the size of the prohibited region of the wiring board 12, the tubular part 159 extending to the outside of the cover 150 is provided contiguous with the edge of the through-hole of the recess 61.

As discussed above, with the mount structure A, assembly work can be easier, and the assembly procedure can be completed in a single step of merely inserting the attachment member 30 into the cover 50 through the opening 51. Furthermore, there is no need to screw down the attachment member 30, nor is it necessary to use a separate box-shaped cover to cover the attachment member 30. Thus, the assembly process is correspondingly simplified and fewer parts are required. Also, the attachment member 30 that has been attached to the cover 50 can be easily removed. Since the sheet metal attachment member 30 is covered by the cover 50 provided to the cabinet 20, it is possible to reduce the size of the prohibited region in which there is no control circuit on the wiring board.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A cabinet structure assembly comprising:
   a cabinet including a wall with an inner face;
   an attachment cover disposed on the inner face of the cabinet, the attachment cover including a top wall portion that faces the inner face of the cabinet and a pair of side wall portions that extend between the inner face of the cabinet and the top wall portion, the top wall portion having an engagement recess with a first engagement face and an end part with an edge that defines an access opening of the attachment cover between the edge of the end part of the top wall portion and the inner face of the cabinet, the end part of the top wall portion being disposed between the engagement recess and the access opening; and
   an attachment member detachably disposed within the attachment cover for removal through the access opening of the attachment cover, the attachment member including
   a base plate with a threaded hole that is aligned with a through-hole of the inner face of the cabinet, and
   a top plate arranged relative to the base plate, the top plate having a top face and an engagement protrusion that protrudes relative to the top face, the engagement protrusion having a second engagement face and a guide face, the second engagement face facing the first engagement face of the engagement recess, the guide face being sloped relative to the top face of the top plate, the guide face being arranged such that the guide face gradually deforms the end part of the top wall portion of the attachment cover away from the top face of the top plate upon installation of the attachment member relative to the attachment cover,
   the attachment cover further including a pair of rib portions disposed on inner surfaces of the side wall portions of the attachment cover, respectively, the rib portions having contact faces that contact with the base plate of the attachment member, respectively, the base plate being sandwiched between the contact faces of the rib portions and the inner face of the cabinet,
   the contact faces of the rib portions of the attachment cover being sloped relative to the inner face of the cabinet such that a spacing between each of the contact faces and the inner face measured in a first direction of the attachment cover that is perpendicular to the inner face of the cabinet decreases as approaching from a first longitudinal end of respective one of the rib portions to a second longitudinal end of the respective one of the rib portions, the first longitudinal end being located closer to the access opening of the attachment cover than the second longitudinal end, the spacing being dimensioned such that the contact faces of the rib portions of the attachment cover pressing the base plate against the inner face of the cabinet upon the attachment member being attached to the attachment cover.

2. The cabinet structure assembly according to claim 1, further comprising
   a fastener configured to couple the attachment member to a wall bracket, the fastener being configured to be threaded into the threaded hole of the base plate.

3. The cabinet structure assembly according to claim 1, wherein
   the attachment member is made of sheet metal.

4. The cabinet structure assembly according to claim 1, wherein
   the attachment cover is made of an electrostatic shielding material, the attachment cover and the cabinet being integrally formed as a one-piece unitary member.

5. The cabinet structure assembly according to claim 1, wherein
   the attachment member is configured to be positioned opposite a wiring board that is disposed within the cabinet.

6. The cabinet structure assembly according to claim 1, wherein
   the attachment member further has a middle plate that extends between end portions of the base plate and the top plate.

7. The cabinet structure assembly according to claim 6, wherein
   the attachment member further has an aperture that extends between the top plate and the middle plate across a corner of the top plate and the middle plate.

8. The cabinet structure assembly according to claim 6, wherein
   the engagement protrusion is arranged relative to a corner between the top plate and the middle plate such that the guide face of the engagement protrusion gradually deforms the end part of the top wall portion of the attachment cover away from the top face of the top plate upon installation of the attachment member.

9. The cabinet structure assembly according to claim 7, wherein
the engagement protrusion of the attachment member is disposed adjacent to the aperture of the attachment member such that the second engagement face forms a part of a peripheral edge that defines the aperture of the attachment member.

10. The cabinet structure assembly according to claim 1, wherein
the access opening of the attachment cover has a peripheral edge that is disposed in a second direction of the cabinet relative to a first end portion of the top plate of the attachment member, the first end portion of the top plate being opposite a second end portion of the top plate, the first end portion of the top plate being located in the second direction of the cabinet relative to the second end portion of the top plate.

11. The cabinet structure assembly according to claim 1, wherein
the top wall portion of the attachment cover further has a tubular part that protrudes away from the inner face of the cabinet, the tubular part having a peripheral inner face that extends through the top wall portion, the peripheral inner face of the tubular part forming the engagement recess of the top wall portion.

12. The cabinet structure assembly according to claim 1, wherein
the second engagement face of the engagement protrusion of the attachment member is disposed closer to a first end portion of the top plate than a second end portion of the top plate, the first end portion being opposite the second end portion, the second end portion forming a free end of the top plate.

13. The cabinet structure assembly according to claim 1, wherein
the engagement recess of the attachment cover is disposed closer to a first edge portion of the top wall portion than a second edge portion of the top wall portion, the first edge portion forming an edge of the access opening of the attachment cover, the second edge portion being opposite the first edge portion.

14. The cabinet structure assembly according to claim 1, wherein
the cabinet has a pair of extending ribs on the inner face of the cabinet, the extending ribs extending parallel to each other such that a fastener opening of the cabinet is disposed between the extending ribs.

15. The cabinet structure assembly according to claim 14, wherein
the extending ribs of the cabinet have curved top surfaces that contact with the base plate of the attachment member.

* * * * *